(12) United States Patent
Bachmann et al.

(10) Patent No.: US 11,181,443 B2
(45) Date of Patent: Nov. 23, 2021

(54) ANTI-FRICTION BEARING (71) Applicant: Cerobear GmbH, Herzogenrath (DE)

(72) Inventors: Hedi Bachmann, Aachen (DE); Jens Wemhoner, Aachen (DE); Beate Bergrath, Wurselen (DE); Peer Kruse, Herzogenrath (DE)

(73) Assignee: Cerobear GmbH, Herzogenrath (DE)

( * ) Notice: Subject to any disclaimer, the term of this patent is extended or adjusted under 35 U.S.C. 154(b) by 0 days.

(21) Appl. No.: 16/721,608

(22) Filed: Dec. 19, 2019

(65) Prior Publication Data
US 2020/0200223 A1 Jun. 25, 2020

(30) Foreign Application Priority Data
Dec. 20, 2018 (DE) .......................... 102018222421.8

(51) Int. Cl.
| | |
|---|---|
| *F16C 41/00* | (2006.01) |
| *G01M 13/045* | (2019.01) |
| *F16C 19/16* | (2006.01) |
| *G01L 5/00* | (2006.01) |
| *F16C 19/52* | (2006.01) |

(52) U.S. Cl.
CPC ......... *G01M 13/045* (2013.01); *F16C 19/163* (2013.01); *F16C 19/527* (2013.01); *G01L 5/0019* (2013.01); *F16C 2233/00* (2013.01)

(58) Field of Classification Search
CPC .... F16C 19/163; F16C 19/166; F16C 19/527; F16C 2233/00; G01L 5/0019
See application file for complete search history.

(56) References Cited

U.S. PATENT DOCUMENTS

| | | | |
|---|---|---|---|
| 4,341,122 A | 7/1982 | Lechler | |
| 10,302,512 B2 | 5/2019 | Heim | |
| 2006/0070460 A1* | 4/2006 | Knokke | F16C 19/522 73/862.322 |
| 2006/0107765 A1 | 5/2006 | Sentoku | |
| 2006/0218927 A1* | 10/2006 | Singh | F01D 25/162 60/772 |
| 2006/0222278 A1* | 10/2006 | Singh | F01D 17/02 384/448 |
| 2008/0033695 A1* | 2/2008 | Sahara | G01H 1/003 702/185 |
| 2011/0125421 A1 | 5/2011 | Takahashi et al. | |

(Continued)

FOREIGN PATENT DOCUMENTS

| | | |
|---|---|---|
| DE | 2911479 | 12/1980 |
| DE | 034496 | 12/1989 |

(Continued)

*Primary Examiner* — Phillip A Johnson
(74) *Attorney, Agent, or Firm* — Faegre Drinker Biddle & Reath LLP (57) ABSTRACT

The invention is based on an antifriction bearing, in particular an angular ball bearing, comprising two bearing rings (12*a-e*, 14*a-e*) and a plurality of rolling elements (16*a-e*), which are arranged between the bearing rings (12*a-e*, 14*a-e*) and held by means of a bearing cage (18*a-e*), and comprising at least one sensor unit (20*a-e*), which includes at least one sensor (22*a-e*) provided at least for the detection of vibrations within the antifiction bearing (10*a-e*).
It is provided that said at least one sensor (22*a-e*) is arranged in the region of a contact angle (24*a-e*) within one of the bearing rings (12*a-e*, 14*a-e*).

18 Claims, 4 Drawing Sheets

(56) References Cited

U.S. PATENT DOCUMENTS

| | | | | |
|---|---|---|---|---|
| 2011/0214513 A1* | 9/2011 | Ikki | ................... | B60B 27/0068 |
| | | | | 73/862.045 |
| 2017/0016786 A1* | 1/2017 | Heim | ................... | F16C 19/522 |
| 2018/0038413 A1* | 2/2018 | Aizawa | ................ | F16C 19/527 |
| 2019/0310164 A1* | 10/2019 | Chen | .................. | G01M 13/045 |

FOREIGN PATENT DOCUMENTS

| | | | | |
|---|---|---|---|---|
| DE | 102009033137 A1 * | 2/2011 | ......... | G01M 13/045 |
| DE | 102011087471 | 6/2013 | | |
| DE | 102014204025 | 9/2015 | | |
| DE | 102016223883 | 6/2018 | | |
| DE | 102017106235 | 9/2018 | | |
| EP | 3290895 | 3/2018 | | |
| GB | 2521600 | 7/2015 | | |
| WO | 2005031296 | 4/2005 | | |
| WO | WO-2005043105 A2 * | 5/2005 | .............. | G01L 5/12 |
| WO | 2013012364 | 1/2013 | | |

\* cited by examiner

ANTI-FRICTION BEARING

The disclosure relates to an antifriction bearing, in particular an angular ball bearing, according to the preamble of claim 1.

WO 2005/031296 A1 describes a data collection and processing system for an antifriction bearing, in which at least one sensor element, conductor tracks and electronic components are arranged on a flexible substrate material. The sensor element is formed as a strain gauge or a Wheatstone bridge. The data collection and processing system is installed in the circumferential groove of an outer ring of an antifriction bearing and attached on an adhesive layer applied to a groove bottom.

It is the object of the present disclosure to provide a generic antifriction bearing with advantageous properties with respect to the detection, in particular the early detection, of bearing damage. The object is achieved by the features of the characterizing portion of claim 1. Advantageous embodiments of the disclosure can be derived from the dependent claims.

DISCLOSURE

The disclosure is based on an antifriction bearing, in particular an angular ball bearing, comprising two bearing rings and a plurality of rolling elements, which are arranged between the bearing rings and held by means of a bearing cage, and comprising at least one sensor unit, which includes at least one sensor provided for the detection of vibrations within the antifiction bearing.

It is suggested that said at least one sensor be arranged in the region of a contact angle within one of the bearing rings. In particular, the sensor is arranged in a region which deviates, in particular, by a maximum of 15°, advantageously by a maximum of 10° and preferably by a maximum of 5°, from the contact angle. Preferably, the region in which the sensor is arranged is exactly in the contact angle.

The antifriction bearing can be formed, in particular, as a radial bearing or an axial bearing. When the antifriction bearing is formed as a radial bearing, one of the bearing rings forms an inner ring and another of the bearing rings forms an outer ring of the antifriction bearing. When the antifriction bearing is formed as an axial bearing, one of the bearing rings forms a shaft washer, while another bearing ring forms a housing washer. The antifriction bearing can be formed, in particular, as a ball bearing, a roller bearing and/or a needle bearing. In particular, the antifriction bearing can be formed as an angular ball bearing. Angular ball bearings have raceways in the inner ring and outer ring that are offset with respect to each other in the direction of the bearing axis. They are therefore particularly suited for bearings which have to support combined loads, i.e. simultaneously acting radial and axial loads. Depending on the configuration of the antifriction bearing, the rolling elements are formed, in particular, as balls, cylindrical rollers or needle rollers.

The rolling elements are arranged in the circumferential direction about the axis of rotation of the antifriction bearing between the bearing rings and roll on the raceways of the bearing rings of the antifriction bearing. The antifriction bearing comprises a bearing cage which is provided for arranging the rolling elements in the circumferential direction at an at least essentially equidistant angular distance with respect to each other. "Provided" is intended to mean especially programmed, designed and/or equipped. An object provided for a particular function is intended to mean, in particular, that the object fulfils and/or performs this particular function at least in one state of application and/or operation. In particular, the bearing cage comprises a plurality of rolling element openings in which the rolling elements of the antifriction bearing are arranged.

To detect bearing damage, in particular for the early detection of bearing damage, on the antifriction bearing, the antifriction bearing apparatus comprises a sensor unit which is configured to detect and/or to identify a signal characteristic for an at least arising and/or existing bearing damage. "Sensor unit" in the present context, in particular, is intended to mean a unit which is provided for detecting, in particular, physical and/or chemical properties and/or the material quality of its surroundings in a qualitative manner and/or as a measuring quantity in a quantitative manner. The sensor unit comprises at least one sensor which is provided, in particular, within at least one bearing ring and/or the bearing cage, at least for the detection of vibrations within the antifriction bearing. As an alternative, the sensor unit may also comprise a plurality of similar or different sensors, at least one of which is provided for detecting vibrations within the antifriction bearing. The sensor of the sensor unit is preferably configured in such a way that it can detect vibrations within at least one bearing ring of the antifriction bearing. During operation of the antifriction bearing, the sensor unit detects vibrations within at least one bearing ring of the antifriction bearing by means of the sensor arranged within a bearing ring. The detected vibrations are monitored, in particular, by means of a frequency analysis with respect to an amplitude increase in a frequency range which is above a ball pass frequency of the bearing rings. Alternatively, the detected vibrations can be monitored, in particular, by means of a frequency analysis with respect to an amplitude increase in a frequency range which is in the range of the ball pass frequency of the bearing rings or in the range of the root mean square of the ball pass frequency of the bearing rings. Such an amplitude increase is characteristic for an arising bearing damage. The detection and/or monitoring of the vibrations is carried out continuously, in particular. The sensor unit is formed, in particular, as an electronic unit which comprises, in addition to the at least one sensor, a plurality of electronic components and/or electronic modules, such as signal amplifiers and/or filters. Alternatively or additionally, the sensor unit can comprise at least one further sensor, which is provided to detect forces, temperatures and/or deformations within the antifriction bearing, in particular within a bearing ring of the antifriction bearing.

The sensor is preferably formed as an acceleration sensor. Alternatively, the sensor can also be any other type of sensor that seems suitable to the person skilled in the art, such as a strain gauge, a vibration sensor, an acoustic emission sensor and/or a combination of different sensor types. Particularly preferably, the sensor is formed as a piezoelectric sensor, preferably as a piezoelectric acceleration sensor, or MEMS sensor, preferably a MEMS acceleration sensor.

The sensor of the sensor unit is arranged directly in one of the bearing rings. Preferably, the entire sensor unit is arranged within one of the bearing rings. In one embodiment of the disclosure it is suggested that at least the sensor or the entire sensor unit be arranged in an outer bearing ring. In particular, the sensor directly contacts a material of the bearing ring. By these means, vibrations occurring within the bearing ring can be advantageously precisely and/or reliably detected by the sensor. Within the bearing ring, the sensor is arranged in the region of a contact angle of the antifriction bearing. The contact angle is the smallest angle between the contact line and the perpendicular radial plane.

The contact line is derived from the theoretical idea that each of the individual rolling elements contacts the raceways on the inner and outer rings at exactly one point. If these contact points are joined, the result is the contact line, which extends exactly through the center of the rolling element. The contact line thus describes the effective line on which an external force applied to the antifriction bearing is transferred from one raceway element via the rolling elements to the other raceway element.

Such an embodiment of the disclosure allows a generic antifriction bearing to be provided with advantageous properties with respect to the detection, in particular early detection, of bearing damage. In particular, the arrangement of the sensor in the region of a contact angle of the antifriction bearing within a bearing ring allows the detection of arising vibrations for the detection of bearing damage in an advantageously reliable manner directly within a bearing ring of the antifriction bearing. Furthermore, the arrangement of the sensor within a bearing ring allows an outer geometry and/or an overall weight of the antifriction bearing to be advantageously unaffected and a high integration density to be advantageously achieved. Furthermore, an advantageously simple replacement of conventional antifriction bearings by antifriction bearings with an integrated sensor unit can be advantageously facilitated.

In a preferred embodiment of the disclosure it is suggested that the sensor is arranged within the bearing ring in such a manner that a detection direction of the sensor extends within the contact angle of the antifriction bearing. In particular, the detection direction of the sensor extends at least essentially along the contact line. The detection direction thereby faces, in particular, in the direction of the raceway of the bearing ring in which the sensor is arranged. This allows a preferably precise and/or reliable detection of vibrations to be achieved within the bearing ring.

It is also suggested that the sensor be embedded in a material of the bearing ring. "Embedded" in the present context is intended to mean, in particular, at least interlocking, preferably backlash free, preferably adhesively/metallurgically connected and/or enclosed. "Enclosed" is intended to mean, in particular, that the portion, in particular at least 50%, advantageously at least 75%, particularly advantageously at least 85% and preferably at least 95% of circumferential points of the sensor that are in contact with the material of the bearing ring, is faced by a circumferential point of the sensor which is also in contact with the material of the bearing ring. Preferably, the sensor is entirely enclosed by the material of the bearing ring and thus fully embedded in the material of the bearing ring. This ensures advantageous arrangement of the sensor within a bearing ring. In particular, the sensor can be advantageously protected against external influences. Furthermore, embedding the sensor in the material of the bearing ring can advantageously achieve reliable detection of vibrations within the bearing ring.

It is also suggested that at least the bearing ring in which the sensor is arranged is at least partially made by an additive manufacturing method. Preferably, the bearing ring can be entirely made by an additive manufacturing method. The bearing ring can be at least partially or fully made, for example, by means of selective laser melting (SLM), by means of electron beam melting (EBM), by means of direct metal laser sintering (DMLS) or by means of another additive manufacturing method. The at least one bearing ring in which the sensor is arranged can consist, for example, at least substantially of M50, ASP®2060, ASP®2030 and/or another bearing steel appearing suitable to the person skilled in the art. To arrange the sensor in a bearing ring, the bearing ring is first additively built up to at least the position at which an arrangement of the sensor is provided within the bearing ring. Alternatively, the bearing ring can be conventionally manufactured while taking into account the position at which an arrangement of the sensor is provided. This is then followed by installing the sensor at the position provided in the bearing ring, whereupon the buildup of the bearing ring is additively continued and/or completed. In particular, both bearing rings of the antifriction bearing can be manufactured by means of an additive manufacturing method. This can advantageously achieve embedding of the sensor in the material of the bearing ring. Furthermore, material weakening, such as can occur when material recesses and/or cavities are provided for arranging a sensor in conventionally made bearing rings can be advantageously avoided.

In one embodiment of the disclosure it is suggested that the sensor be arranged in the region of a raceway within the bearing ring. Preferably, the sensor is arranged below, in particular directly below, the raceway. In particular, the sensor can be embedded directly in the raceway and/or below the raceway. The raceway is preferably applied to the sensor by means of an additive manufacturing method. The raceway can be applied to the sensor, for example, by means of selective laser melting (SLM), by means of electron beam melting (EBM), by means of direct metal laser sintering (DMLS) or by means of any other additive manufacturing method. To arrange the sensor in a bearing ring below the raceway, the bearing ring is first additively built up to the position at which an arrangement of the sensor is provided below the raceway. Alternatively, the bearing ring can be conventionally manufactured while taking the position into account at which an arrangement of the sensor is provided. Then the sensor is installed at the position provided in the bearing ring, whereupon the raceway is applied to the sensor by means of an additive manufacturing method. Sensors formed as strain gauges are particularly suitable for arrangement below the raceway. Alternatively, it is also conceivable to selectively produce layers by means of additive manufacturing, that can be strained, i.e. that have properties of a strain gauge without a strain gauge having to be installed. This can advantageously achieve embedding of the sensor below the raceway of the bearing ring.

It is also suggested that the sensor unit comprise an evaluation unit which is provided to identify the sensor measuring value exceeding a predetermined limit value. "Evaluation unit" is intended to mean, in particular, an electronic unit, which comprises, in particular, at least one processor unit and/or at least one memory unit, in particular with an operating program stored in the at least one memory unit. Preferably, the evaluation unit comprises a microcontroller. In particular, the evaluation unit is provided for a preferably continuous evaluation of the sensor measuring values. In particular, the sensor is provided to preferably continuously transmit the sensor measuring values to the evaluation unit in a wired or wireless manner. Alternatively, the evaluation unit can be provided to retrieve the sensor measuring values preferably continuously from the sensor in a wired or wireless manner. The evaluation unit can be arranged, in particular, within the bearing ring just like the sensor. Alternatively, the evaluation unit can also be at least partially arranged outside of the bearing ring. The sensor measuring values transmitted by the sensor to the evaluation unit include at least information on vibrations arising in the bearing ring and detected by the sensor. The evaluation unit is provided, in particular, to monitor the sensor measuring values, in particular by means of a frequency analysis with respect to an amplitude increase in a frequency range that is above a ball pass frequency of the bearing rings. Alternatively or additionally, the evaluation unit can be provided to monitor the sensor measuring values in particular by means of a frequency analysis with respect to an amplitude increase in a frequency range that is in the region of the ball pass frequency of the bearing rings or in the region of the root mean square of the ball pass frequency of the bearing rings. This ensures an advantageous evaluation of the sensor measuring values in view of any arising bearing damage.

It is also suggested that the sensor unit comprise an output unit which is provided to generate an output signal when a limit value is exceeded. Preferably, a limit value being exceeded as detected by the evaluation unit immediately causes an output signal to be generated and/or transmitted. The output unit can be formed, in particular, as an optic and/or acoustic output unit, which comprises at least one optic output means, such as an LED, and/or at least one acoustic output means, such as a loudspeaker or a buzzer. When the output unit is formed as an optic and/or an acoustic output unit, the output unit is provided, in particular, to output an optic and/or acoustic signal when a limit value is exceeded. Alternatively or additionally, the output unit can be formed as a wired and/or preferably wireless transmission unit. When the output unit is formed as a transmission unit, the output unit is provided, in particular, to transmit an electric and/or electromagnetic signal to a higher-level receiver when a limit value is exceeded. The output unit can also be arranged within the bearing ring just like the sensor. Alternatively, however, the output unit can be at least partially arranged outside of the bearing ring. This helps to advantageously reliably signal the presence and/or the genesis of bearing damage.

A method is also provided for the early detection of bearing damage on an antifriction bearing according to the present disclosure, in particular an angular ball bearing, comprising two bearing rings and a plurality of rolling elements, which are arranged between the bearing rings and held by means of a bearing cage, and comprising at least one sensor unit, which comprises at least one sensor, which is provided at least for the detection of vibrations within the antifriction bearing, in which vibrations are detected by means of the sensor unit within at least one bearing ring and monitored by means of a frequency analysis with respect to an amplitude increase in a frequency range that is above a ball pass frequency of the bearing ring. In particular, the monitoring fully covers a frequency range from zero to a predefined frequency value, such as factor 15 of the ball pass frequency of the bearing rings. When bearing damage arises, there is an amplitude increase within a predefined frequency window in a higher frequency range that is, in particular, twice or four times the ball pass frequency of the bearing rings. This frequency window can have a width of, in particular, about 100 to 250 Hz. If the amplitude in the predefined frequency window exceeds a predefined limit value, this indicates the genesis of bearing damage. The method can be applied to all types of antifriction bearings, such as ball bearings, roller bearings (tapered rollers, spherical rollers, cylindrical rollers, barrel rollers), radial and axial bearings, hybrid, ceramic and steel bearings, such as crossed roller bearings. This allows advantageously reliable detection, in particular early detection, of bearing damage to an antifriction bearing.

The antifriction bearing according to the present disclosure and/or the method according to the present disclosure should not be limited to the above-described application and embodiment. In particular, the antifriction bearing according to the present disclosure and/or the method according to the present disclosure, to fulfil any of the above-described functions, can include a number of individual elements, components, units and/or method steps deviating from the number mentioned above.

DRAWINGS

Further advantages can be derived from the following description of the drawing. In the drawing, five exemplary embodiments of the disclosure are shown. The drawing, the description and the claims include numerous features in combination. The person skilled in the art will also suitably view the features alone and will combine them to suitable further combinations.

In the drawing.

DESCRIPTION OF THE EXEMPLARY EMBODIMENTS

Figure 1:
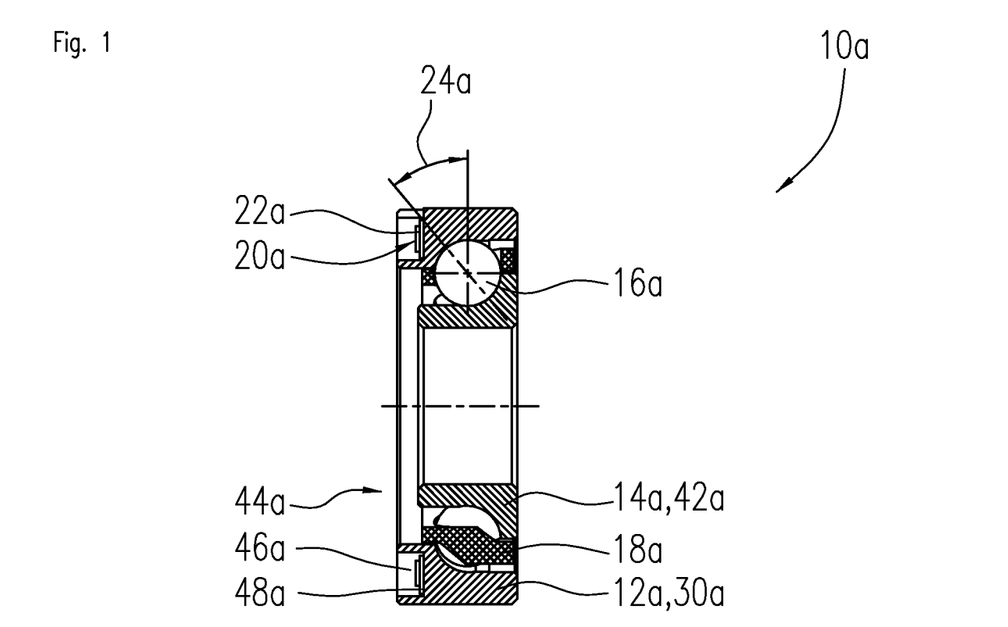
FIG. 1 shows a sectional view of an antifriction bearing comprising a sensor unit arranged in an end-side groove, wherein a sensor of the sensor unit is arranged within a region of the contact angle of the antifriction bearing.

FIG. 1 shows a sectional view of an antifriction bearing 10a. The antifriction bearing 10a is formed as an angular ball bearing as an example. The antifriction bearing 10a comprises two bearing rings 12a, 14a, wherein a first bearing ring 12a forms an outer bearing ring 30a and a second bearing ring 14a forms an inner bearing ring 42a. Furthermore, the antifriction bearing 10a comprises a plurality of rolling elements 16a, which are arranged between the bearing rings 12a, 14a. The rolling elements 16a are held between the bearing rings 12a, 14a by means of a bearing cage 20a.

In addition, the antifriction bearing 10a includes a sensor unit 20a. The sensor unit 20a comprises at least one sensor 22a, provided for the purpose of early detection of bearing damage, at least for the detection of vibrations within the antifriction bearing 10a. The sensor 22a is preferably formed as an acceleration sensor. The sensor 22a is preferably formed as a piezoelectric sensor, preferably a piezoelectric acceleration sensor, or as a MEMS sensor, preferably a MEMS acceleration sensor. In addition to the sensor 22a, the sensor unit 20a may comprise a plurality of electronic components and/or electronic modules, such as signal amplifiers and/or filters. During operation of the antifriction bearing 10a the sensor unit 20a detects vibrations within the bearing ring 12a by means of a sensor 22a arranged within the bearing ring 12a.

The sensor 22a is arranged within one of the bearing rings 12a, 14a. Preferably, the sensor 22a is arranged in the respective bearing ring 12a, 14a that is stationary in an application of the antifriction bearing 10a. In the embodiment of the antifriction bearing 10a shown, the sensor 22a of the sensor unit 20a is arranged in the region of a contact angle 24a within the bearing ring 12a forming the outer bearing ring 30a. Alternatively it is also conceivable that the sensor 22a of the sensor unit 20a is arranged in the region of a contact angle 24a within the bearing ring 14a forming the inner bearing ring 42a.

Figure 3:
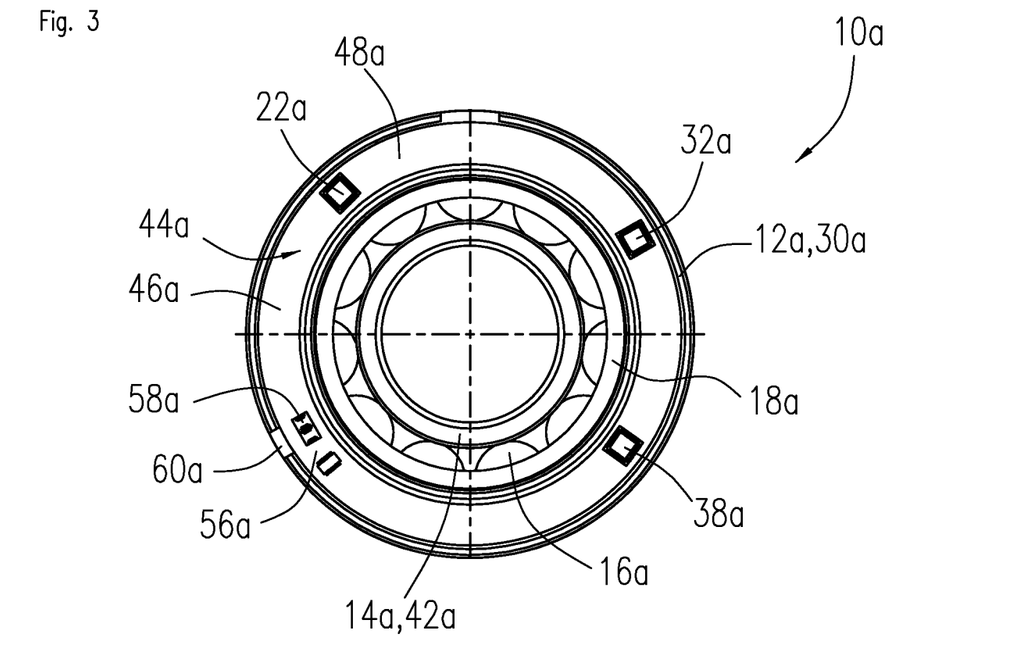
FIG. 3 shows an end-side view of the antifriction bearing of FIG. 1 with an alternative embodiment of the sensor unit.
Figure 4:
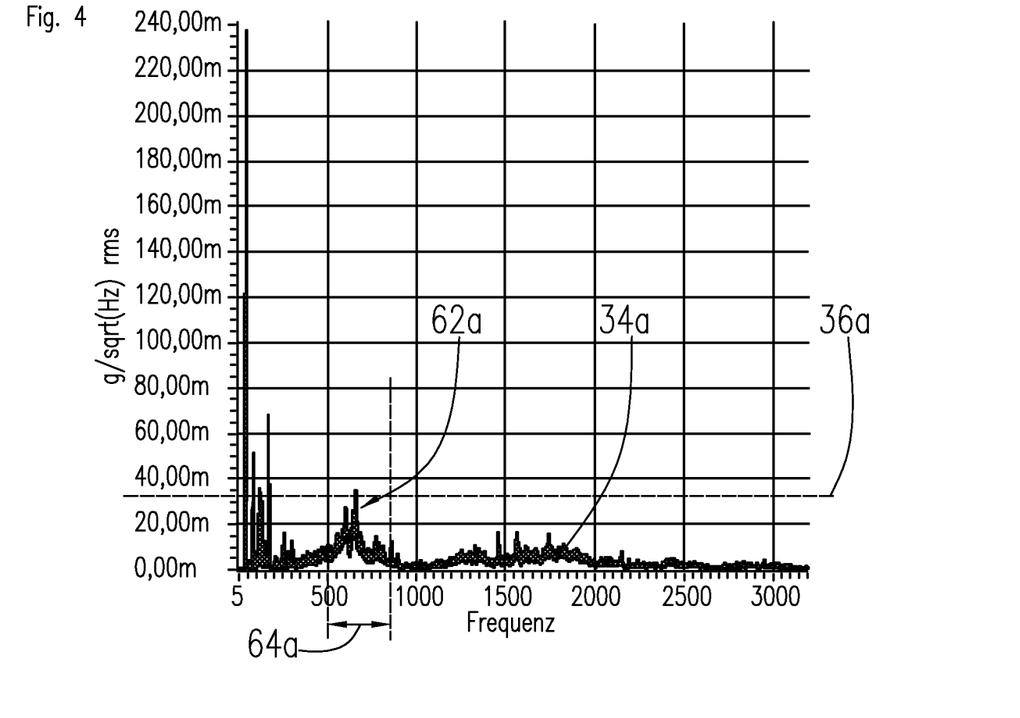
FIG. 4 shows an exemplary frequency spectrum on the basis of which an arising bearing damage is detectable.

The vibrations detected by the sensor 22a are monitored by means of a frequency analysis with respect to an amplitude increase 62a in a frequency range which is above a ball pass frequency of the bearing rings 12a, 14a (cf. FIG. 4). For this purpose, the sensor unit 20a comprises an evaluation unit 32a (cf. FIGS. 2 and 3). The evaluation unit 32a is provided to detect when a sensor measuring value 36a exceeds a predetermined limit value 34a. In particular, the evaluation unit 32a is provided to detect an amplitude increase 62a within the monitored frequency range beyond a predetermined limit value 34a. In particular, the evaluation unit 32a is provided for a preferably continuous evaluation of the sensor measuring values 36a. The sensor 22a transmits the sensor measuring values 36a preferably continuously to the evaluation unit 32a. In addition to the evaluation unit 32a, the sensor unit 20a also comprises an output unit 38a (cf. FIGS. 2 and 3). The output unit 38a is provided to generate an output signal when a limit value is exceeded in the monitored frequency range as determined by the evaluation unit 32a. Preferably, when the limit value is exceeded as detected by the evaluation unit 32a, an output signal is directly generated and/or transmitted. Preferably, the output unit 38a is formed as a wired and/or preferably wireless transmission unit. The output unit 38a is provided, in particular, to transmit an electric and/or electromagnetic signal to a higher-level receiver when a limit value is exceeded.

To arrange the sensor 22a, the bearing ring 12a formed as the outer bearing ring 30a has a groove 46a at its end side 44. The groove 46a is preferably formed to be circumferential. The groove 46a is provided at least for receiving the sensor 22a. Preferably, however, the entire sensor unit 20a can be accommodated within the groove 46a in the bearing ring 12a (cf. FIGS. 2 and 3). By arranging the sensor 22a or the entire sensor unit 20a within the groove 46a, the sensor 22a is arranged within the bearing ring 12a in such a manner that the sensor 22a is at least essentially within a region of the contact angle 24a.

Figure 2:
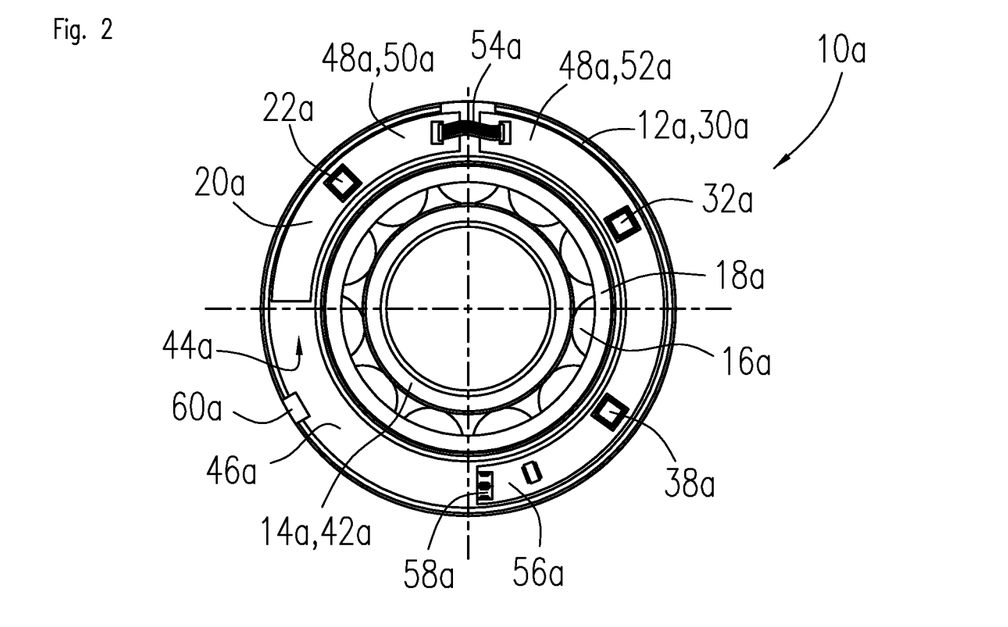
FIG. 2 shows an end-side view of the antifriction bearing of FIG. 1.

The FIGS. 2 and 3 each show a view of the antifriction bearing 10a as seen from the end side 44a of the bearing ring 12a. The groove 46a is formed as a continuous, annular groove 46a on the end side 44a of the bearing ring 12a. The groove 46a has the respective entire sensor unit 20a arranged within it. FIG. 2 shows the sensor unit 20a in the form of two circular segment-shaped printed circuit boards 48a arranged within the groove 46a. The printed circuit boards 48a are a sensor circuit board 50a on which the sensor 22a is arranged, and an additional printed circuit board 52a on which at least the evaluation unit 32a, the output unit 38a and voltage supply 56a are arranged. In addition, a temperature sensor, not shown, can also be arranged on the sensor circuit board 50a and/or the additional printed circuit board 52a. The sensor circuit board 50a and the additional printed circuit board 52a can be connected with each other, as shown, via a cable connection 54a. FIG. 3 shows the sensor unit 20a in the form of an individual circular closed printed circuit board 58a arranged within the groove 46a. Arranged on the printed circuit board 58a are at least both the sensor 22a and the evaluation unit 32a, the output unit 38a and a voltage supply 56a. In addition, a temperature sensor, not shown, can also be provided on the printed circuit board 58a. The voltage supply 56a can be realized in both cases, for example, via a cable connection, not shown, which passes into the groove 46a via a recess 60a and connected to a plug connector 60a on the printed circuit board 48a, or the additional printed circuit board 52a. Alternatively, the voltage supply 56a can also be realized as a battery and/or a suitable energy harvester. To protect the sensor unit 20a, it can be molded within the groove 46a with a potting material.

For the early detection of bearing damage on the antifriction bearing 10a, vibrations are detected within the bearing ring 12a by means of the sensor unit 20a and monitored by means of a frequency analysis with respect to an amplitude increase 62a in a frequency range that is above a ball pass frequency of the bearing rings 12a, 14a. An exemplary frequency spectrum is shown in FIG. 4. When bearing damage arises, there is an amplitude increase 62a within the predefined frequency window 64a in a higher frequency range, which is, in particular, about twice to four times the ball pass frequency of the bearing rings. This frequency window 64a can have a width of, in particular, about 100 to 300 Hz. When the amplitude in the predefined frequency window 64a exceeds a predefined limit value 34a, this indicates the genesis of bearing damage.

FIGS. 5 to 8 show four further exemplary embodiments of the disclosure. The subsequent descriptions and the drawings are essentially limited to the differences between the exemplary embodiments, wherein with reference to similarly indicated components, in particular with reference to components having the same reference numerals, basically reference is made to the drawings and/or the description of the other exemplary embodiment, in particular of FIGS. 1 to 4. To differentiate the exemplary embodiments, the letter a is added to the reference numerals of the exemplary embodiment in FIGS. 1 to 4. In the exemplary embodiments of FIGS. 5 to 8, the letter a has been replaced by letters b to e.

Figure 5:
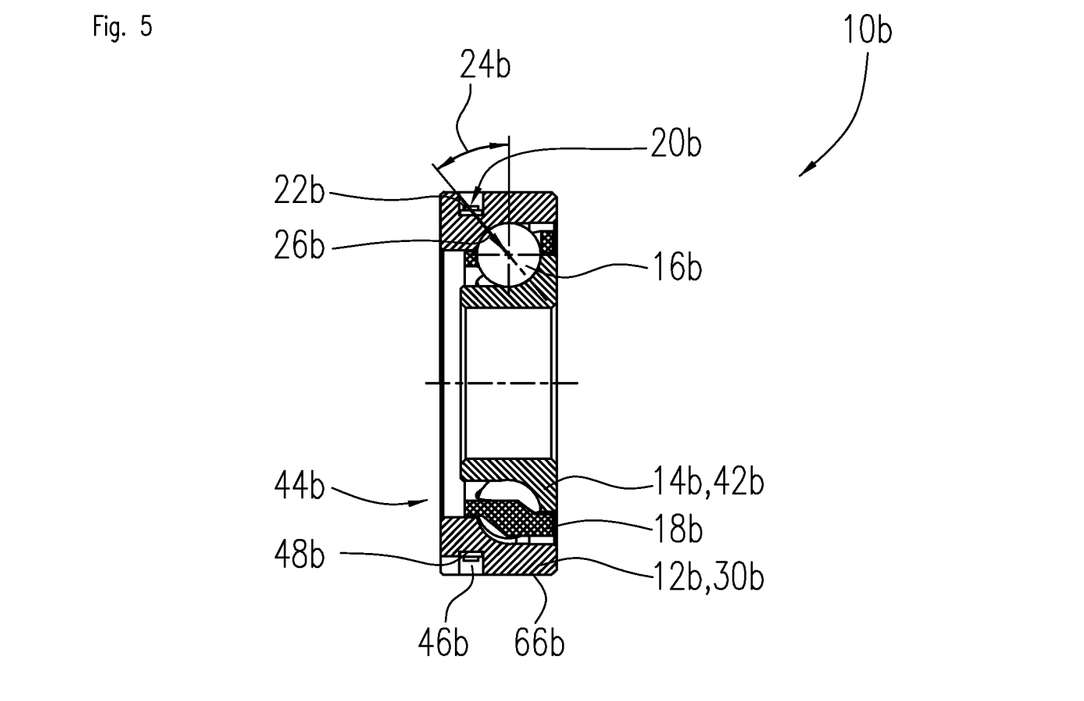
FIG. 5 shows a sectional view of an alternative antifriction bearing comprising a sensor unit arranged in a circumferential groove, wherein a sensor of the sensor unit is arranged within a region of the contact angle of the antifriction bearing.

FIG. 5 shows a sectional view of an alternatively formed antifriction bearing 10b. The antifriction bearing 10b comprises two bearing rings 12b, 14b, wherein a first bearing ring 12b forms an outer bearing ring 30b and a second bearing ring 14b forms an inner bearing ring 42b.

The antifriction bearing 10b comprises a sensor unit 20b with at least one sensor 22b provided for the purpose of an early detection of bearing damage at least to detect vibrations within the antifriction bearing 10b. The sensor 10b is arranged within the outer bearing ring 30b in the region of the contact angle 24b of the antifriction bearing 10b.

To arrange the sensor 22b the outer bearing ring 30b includes a groove 46b on its outer circumference 66b. The groove 46b is preferably formed to be circumferential. The groove 46b is provided at least for the accommodation of the sensor 22b. Preferably, however, the entire sensor unit 20b can also be arranged within the groove 46b in the bearing ring 12b. By arranging the sensor 22b or the entire sensor unit 20b within the groove 46b, the sensor 22b is arranged within the bearing ring 12b in such a manner that the sensor 22b is at least essentially within a region of the contact angle 24b. To enable installation of the sensor unit 20b in the groove 46b, the elements of the sensor unit 20b are preferably applied to a flexible printed circuit board 48b.

Figure 6:
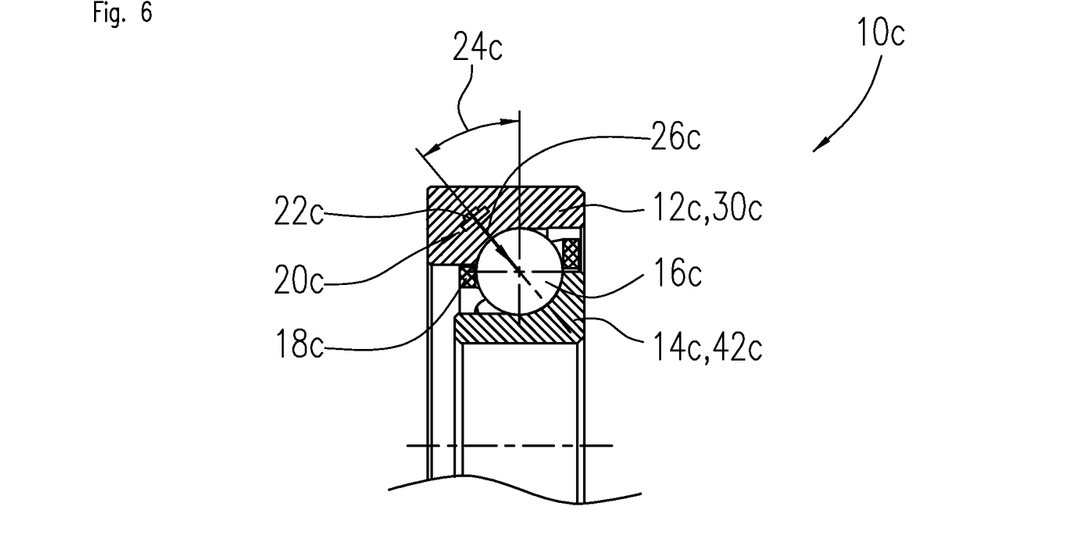
FIG. 6 shows a sectional view of a further alternative antifriction bearing comprising a sensor unit embedded in the outer bearing ring, wherein the detection direction of the sensor of the sensor unit extends within the contact angle.

FIG. 6 shows a sectional view of a further embodiment of an antifriction bearing 10c. The antifriction bearing 10c comprises two bearing rings 12c, 14c, wherein a first bearing ring 12c forms an outer bearing ring 30c and a second bearing ring 14c forms an inner bearing ring 42c.

The antifriction bearing 10c includes a sensor unit 20c with at least one sensor 22c provided for an early detection of bearing damage at least for the detection of vibrations within the antifriction bearing 10c. The sensor 22c is arranged within the outer bearing ring 30c in the region of the contact angle 24c of the antifriction bearing 10c. The sensor 22c is arranged within the bearing ring 12c in such a manner that the detection direction 26c of the sensor 22c extends in the contact angle 24c of the antifriction bearing 10c. The detection direction 26c of the sensor 22c extends along the contact line.

The sensor 22c is fully embedded in a material of the bearing ring 12c. To embed the sensor 22c in the material of the bearing ring 12c, the bearing ring 12c in which the sensor 22c is arranged is made by means of an additive manufacturing method. The bearing ring 12c can be made by means of selective laser melting (SLM), by means of electron beam melting (EBM), by means of direct metal laser sintering (DMLS) or by means of another additive manufacturing method. To arrange the sensor 22c in the bearing ring 12c, the bearing ring 12c is first additively built up to the position at which an arrangement of the sensor 22c is provided within the bearing ring 12c. Then, the sensor 22c is installed at the position provided in the bearing ring 12c, whereupon the buildup of the bearing ring 12c is additively continued and/or completed.

Figure 7:
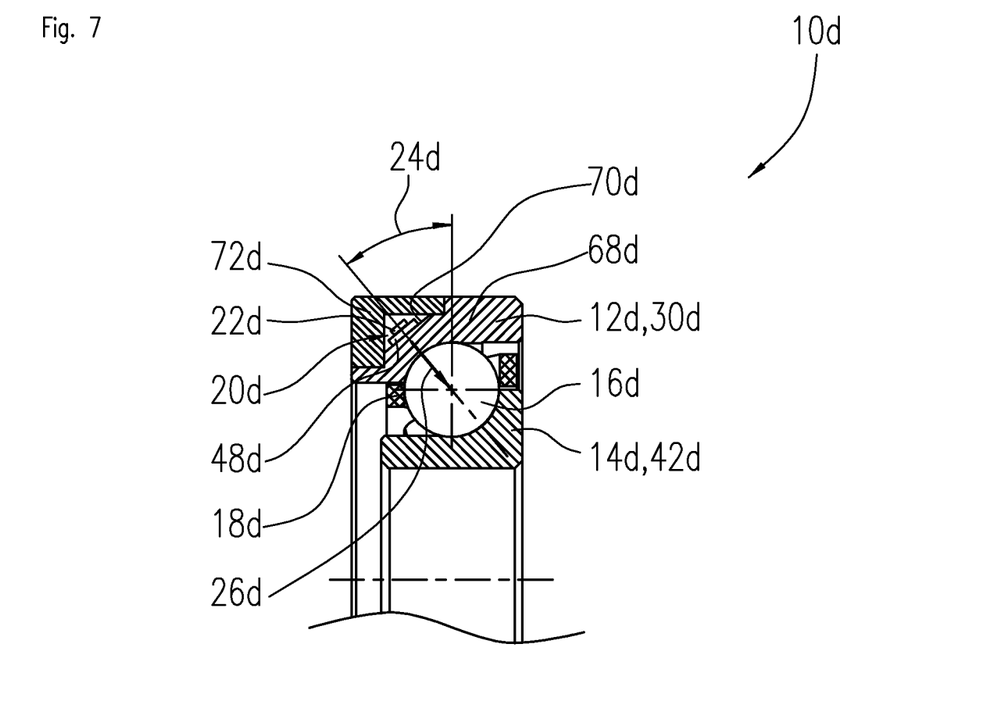
FIG. 7 shows a sectional view of a further alternative antifriction bearing comprising a sensor unit arranged on the mounting surface extending perpendicular to the contact angle, wherein the detection direction of a sensor of the sensor unit extends within the contact angle.

FIG. 7 shows a sectional view of a further embodiment of an antifriction bearing 10d. The antifriction bearing 10d comprises two bearing rings 12d, 14d, wherein a first bearing ring 12d forms an outer bearing ring 30d and a second bearing ring 14d forms an inner bearing ring 42d.

The antifriction bearing 10d includes a sensor unit 20d with at least one sensor 22d provided for the purpose of an early detection of bearing damage at least for the detection of vibrations within the antifriction bearing 10d. The sensor 22d is arranged within the outer bearing ring 30d in the region of the contact angle 24d of the antifriction bearing 10d. The sensor 22d is arranged within the bearing ring 12d in such a manner that a detection direction 26d of the sensor 22d extends in the contact angle 24d of the antifriction bearing 10d. The detection direction 26d of the sensor 22d extends along the contact line.

The bearing ring 12d comprises a base body 68d on which the sensor 22d is arranged. The base body 68d comprises a mounting surface 70d which extends essentially perpendicular to the contact angle 24d, or the contact line. The mounting surface 70d is formed to be, in particular, circumferential. The sensor 22d is applied to the mounting surface 70d so that the detection direction 26d of the sensor 22d extends in the contact angle 24d of the antifriction bearing 10d. The sensor 22d is covered by means of a cover element 72d which is connected to the base body 68d of the bearing ring 12d by adhesive/metallurgical and/or interlocking means. To enable application of the entire sensor unit 20d on the circumferential mounting surface 70d the elements of the sensor unit 20d are preferably applied to a flexible printed circuit board 48d.

Figure 8:
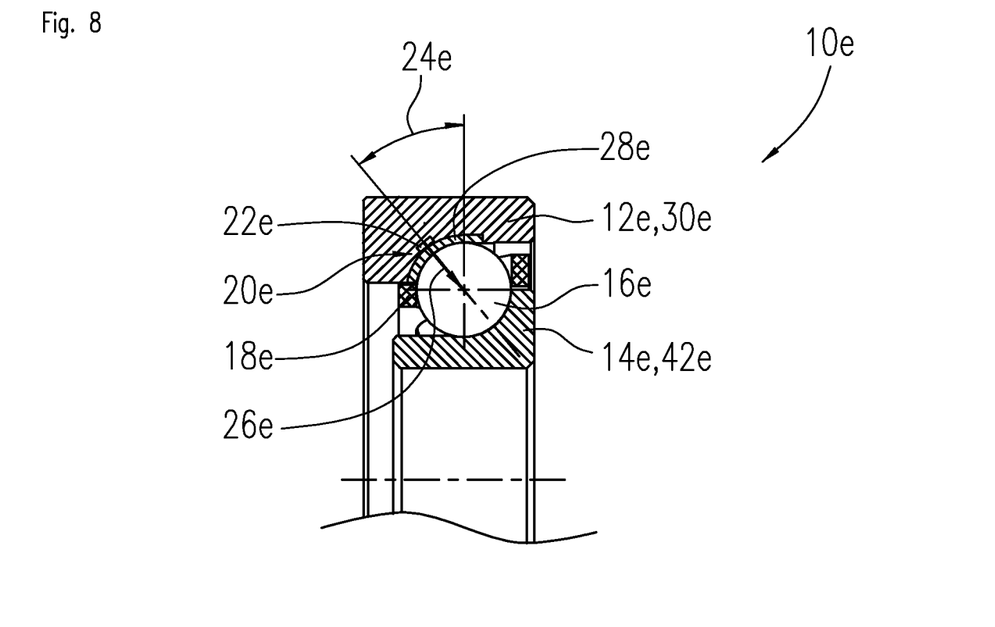
FIG. 8 shows a sectional view of a further alternative antifriction bearing comprising a sensor unit arranged below a raceway.

FIG. 8 shows a sectional view of a further embodiment of an antifriction bearing 10e. The antifriction bearing 10e comprises two bearing rings 12e, 14e, wherein a first bearing ring 12e forms an outer bearing ring 30e and a second bearing ring 14e forms an inner bearing ring 42e.

The antifriction bearing 10e includes a sensor unit 20e with at least one sensor 22e provided for the purpose of an early detection of bearing damage at least for a detection of vibrations within the antifriction bearing 10e. The sensor 22e is arranged within the outer bearing ring 30e in the region of the contact angle 24e of the antifriction bearing 10e. The sensor 22e is arranged within the bearing ring 12e in such a manner that a detection direction 26e of the sensor 22e extends in the contact angle 24e of the antifriction bearing 10e. The detection direction 26e of the sensor 22e extends along the contact line.

The sensor 22e is arranged in the region of a raceway 28e within the bearing ring 12e. Preferably, the sensor 22e is arranged immediately below the raceway 28e. The sensor 22e is preferably formed as a strain gauge. To arrange the sensor 22e below the raceway 28e, the raceway 28e is preferably applied to the sensor 22e by means of an additive manufacturing method. The raceway 28e can be applied to the sensor 22e, for example, by means of selective laser melting (SLM), by means of electron beam melting (EBM), by means of direct metal laser centering (DMLS) or by means of another additive manufacturing method. To arrange the sensor 22e below the Raceway 28e, the bearing ring 12e is first additively built up to the position at which an arrangement of the sensor 22e is provided immediately below the raceway 28e. Alternatively, the bearing ring 12e can be conventionally made while taking into account the position at which an arrangement of the sensor 22e is provided. Then, the sensor 22e is inserted at the position provided in the bearing ring 12e, whereupon the raceway 28e is applied on the sensor by means of an additive manufacturing method.

LIST OF REFERENCE NUMERALS 10 antifriction bearing
12 bearing ring
14 bearing ring
16 rolling element
18 bearing cage
20 sensor unit
22 sensor
24 contact angle
26 detection direction
28 raceway
30 outer bearing ring
32 evaluation unit
34 limit value
36 sensor measuring value
38 output unit
42 inner bearing ring
44 end face
46 groove
48 printed circuit board
50 sensor circuit board
52 additional printed circuit board
54 cable connection
56 voltage supply
58 plug connector
60 recess
62 amplitude increase
64 frequency window 66 outer circumference
68 base body
70 mounting surface
72 cover element

The invention claimed is:

1. An antifriction, angular ball bearing, comprising two bearing rings and a plurality of balls, the balls arranged between the bearing rings and held by a bearing cage, and comprising at least one sensor unit, which includes at least one sensor provided at least for the detection of vibrations within the antifriction bearing, wherein said at least one sensor is arranged in a region of a contact angle within one of the bearing rings, one of the plurality of balls contacting a contact point on each of the bearing rings, a contact line extending through the contact point on each of the bearing rings and a center of the one of the plurality of balls, the contact line angled with respect to a line perpendicular to an axis of rotation of the bearing, the smallest angle between the contact line and the line perpendicular to the axis of rotation of the bearing defining the contact angle, a detection direction of the sensor extends within the contact angle at least essentially along the contact line.

2. The antifriction bearing according to claim 1, wherein the sensor is embedded in a material of the one of the bearing rings.

3. The antifriction bearing according to claim 2, wherein the entire sensor unit is arranged within the one of bearing rings.

4. The antifriction bearing according to claim 1, wherein the entire sensor unit is arranged within the one of the bearing rings.

5. The antifriction bearing according to claim 1, wherein the sensor is arranged in the region of a raceway within the one of the bearing rings.

6. The antifriction bearing according to claim 5, wherein the sensor is arranged below the raceway.

7. The antifriction bearing according to claim 6, wherein the raceway is applied to the sensor by means of an additive manufacturing method.

8. The antifriction bearing according to claim 5, wherein the raceway is applied to the sensor by an additive manufacturing method.

9. The antifriction bearing according to claim 1, wherein at least the sensor is arranged in an outer bearing ring of the bearing rings.

10. The antifriction bearing according to claim 1, wherein the at least one sensor comprises a piezoelectric sensor.

11. The antifriction bearing according to claim 1, wherein the at least one sensor comprises a MEMS-sensor.

12. The antifriction bearing according to claim 1, wherein the at least one sensor comprises a strain gauge.

13. The antifriction bearing according to claim 1, wherein the sensor unit comprises an evaluation unit, which is provided to detect when a sensor measuring value exceeds a predetermined limit value.

14. The antifriction bearing according to claim 13, wherein the sensor unit comprises an output unit which is provided to generate an output signal when a limit value is exceeded.

15. A method for the early detection of a bearing damage on an antifriction bearing, according to any one of the preceding claims, comprising the steps of:
 detecting with the sensor unit vibrations within at least one of the bearing rings; and monitoring with a frequency analysis with respect to an amplitude increase in a frequency range that is above a ball pass frequency of the bearing rings.

16. The antifriction bearing according to claim 1, wherein the sensor is embedded in a material of the one of the bearing rings.

17. The antifriction bearing according to claim 1, wherein the entire sensor unit is arranged within the one of bearing rings.

18. The method of claim 15, further comprising the step of making at least the one of the bearing rings in which the sensor is arranged is at least partially by means of an additive manufacturing method.

* * * * *